(12) United States Patent
Brassil et al.

(10) Patent No.: US 9,507,012 B2
(45) Date of Patent: Nov. 29, 2016

(54) DETERMINING THE POSITION OF A MOBILE DEVICE WITHIN A STRUCTURE

(71) Applicant: HEWLETT-PACKARD DEVELOPMENT COMPANY, L.P., Houston, TX (US)

(72) Inventors: John T. Brassil, Princeton, NJ (US); Lee Edward Fuller, Warrington (GB); Christopher Thomas Pearson, Victoria (CA); Neil Cashman, Warrington (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/908,704

(22) PCT Filed: Jul. 31, 2013

(86) PCT No.: PCT/US2013/052969
§ 371 (c)(1),
(2) Date: Jan. 29, 2016

(87) PCT Pub. No.: WO2015/016893
PCT Pub. Date: Feb. 5, 2015

(65) Prior Publication Data
US 2016/0187459 A1 Jun. 30, 2016

(51) Int. Cl.
*H04W 24/00* (2009.01)
*G01S 5/06* (2006.01)
(Continued)

(52) U.S. Cl.
CPC ............... *G01S 5/06* (2013.01); *H04W 4/04* (2013.01); *H04W 64/00* (2013.01)

(58) Field of Classification Search
CPC .. H04W 64/00; H04W 4/02; H04L 29/08657
USPC ............ 455/456.5, 456.1, 422.1, 414.2, 423
See application file for complete search history.

(56) References Cited

U.S. PATENT DOCUMENTS

| 8,086,248 B2* | 12/2011 | Coronel ................. | H04W 4/20 455/404.2 |
| 8,271,014 B2 | 9/2012 | Gholmieh et al. | |
| 2004/0110514 A1* | 6/2004 | Kim ...................... | H04W 64/00 455/456.1 |

(Continued)

FOREIGN PATENT DOCUMENTS

| CN | 102790970 A | 11/2012 |
| KR | 10-2001-0110518 A | 12/2001 |
| KR | 10-2011-0049594 A | 5/2011 |

OTHER PUBLICATIONS

International Search Report and Written Opinion, International Application No. PCT/US2013/052969, Date: Apr. 24, 2014, pp. 1-11.

(Continued)

*Primary Examiner* — Nghi H Ly
(74) *Attorney, Agent, or Firm* — Hewlett Packard Enterprise Patent Department

(57) ABSTRACT

Examples of determining the position of a mobile device within a structure are disclosed. In one example implementation according to aspects of the present disclosure, a computing device may include a processor and a memory. The computing device may further include an extraction module stored in the memory and executing on the processor to extract from a location-based service data stream a signal measurement of the path loss between a mobile device and a plurality of radio nodes distributed throughout a structure. The computing device may also include a positioning determining module stored in the memory and executing on the processor to determine the position of the mobile device within the structure using a known location for each of the plurality of radio nodes distributed throughout the structure by performing a linear optimization using the extracted signal measurement of the path loss.

8 Claims, 3 Drawing Sheets

(51) Int. Cl.
*H04W 64/00* (2009.01)
*H04W 4/04* (2009.01)

(56) References Cited

U.S. PATENT DOCUMENTS

| | | |
|---|---|---|
| 2005/0020210 A1 | 1/2005 | Krumm et al. |
| 2008/0198072 A1 | 8/2008 | Elwell et al. |
| 2012/0028629 A1 | 2/2012 | Liu et al. |
| 2012/0231786 A1* | 9/2012 | Ling .................... G01S 5/0289 455/424 |
| 2012/0257544 A1 | 10/2012 | Schein et al. |
| 2013/0095853 A1 | 4/2013 | Islam et al. |

OTHER PUBLICATIONS

Jakub Borkowski and Jukka Lempiainen, "Pilot Correlation Positioning Method for Urban UMTS Networks," Feb. 25, 2005, pp. 1-5.

Shahid Ali and Dr. Philip Nobles, "A Novel Indoor Location Sensing Mechanism for IEEE 802.11 b/g Wireless Lan," WPNC'07, Hannover, Germany, 2007, pp. 9-15, IEEE.

* cited by examiner

DETERMINING THE POSITION OF A MOBILE DEVICE WITHIN A STRUCTURE

BACKGROUND

Large office buildings and other large structures may contain numerous users of mobile devices (e.g., cellular telephones, smart phones, tablet computing devices with mobile access, etc.). Often times, these buildings or structures may contain dedicated indoor radio access networks connected to mobile provider networks to provide users with greater mobile network coverage.

BRIEF DESCRIPTION OF THE DRAWINGS

The following detailed description references the drawings, in which.

DETAILED DESCRIPTION

Figure 1:
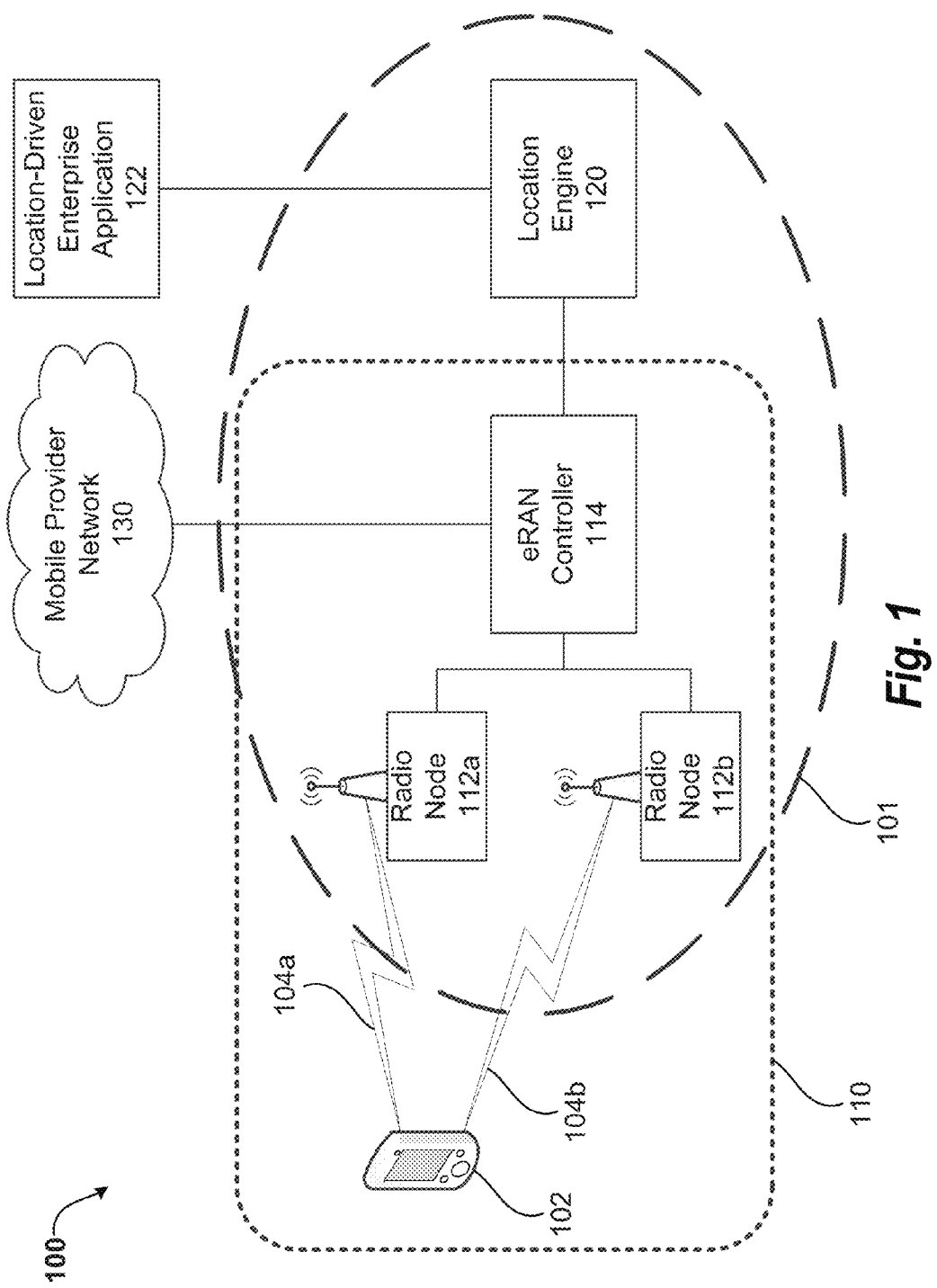
FIG. 1 illustrates a block diagram of an environment for determining the position of a mobile device within a structure according to examples of the present disclosure.

Wireless communications networks and their associated mobile computing devices including smartphones and tablets have altered the behavior and expectations of enterprises. For example, these enterprises may desire to have mobile applications deliver services and data in support of business processes. An enterprise and its users expect seamless communication outside of and within the enterprise's physical structure or building. Enterprises may now desire to recognize and adapt to context (e.g., location and motion, available resources, identity and roles, activity and time, etc.) surrounding the mobile device users. Context-awareness enables the personalization of applications, thus providing higher quality and more personalized services. However, providing such context-awareness requires determining location of a mobile device (and its associated user) within a structure as location is a critical factor in determining context and the relevance of a service to a user.

Conventional enterprise network technology is poorly suited to address this need. For example, many enterprises utilize some form of wireless networking topology such as the family of 802.11 standards or other suitable wireless technologies. However, these systems are ineffective in determining the location of a mobile device, often because users either do not enable the wireless networking feature of their mobile device or because the users fail to install specialized software or applications to enable their positions to be determined.

Various embodiments will be described below by referring to several examples of determining the position of a mobile device within a structure. By utilizing indoor cellular radio access networks and unmodified mobile devices, the various examples described below may determine the position or location of the mobile devices within a structure containing the indoor cellular access network. Such location or position determination may enable the deployment of location-aware and context-aware applications.

In some implementations, the lesser distance between the radio nodes and mobile devices may reduce localization/positioning errors. Similarly, the topology (both layout and spatial density) of the radio nodes may be engineered to improve positioning accuracy. Moreover, because users embrace their personal mobile devices, the probability of the devices being carried frequently is high, thus increasing the effectiveness and usefulness of the positioning system. Additionally, an identity related to the mobile device may enable location-based applications to provide user specific content to the mobile device, and applications may benefit from the unambiguous identities associated with the users of the mobile devices and the devices themselves. Finally, because the mobile devices need not be specially configured or otherwise modified, users may be more apt to opt-in to participating in the positioning system. These and other advantages will be apparent from the description that follows.

FIG. 1 illustrates a block diagram of an environment 100 for determining the position of a computing device 102 within a structure 110 according to examples of the present disclosure. In the example shown, the environment 100 may include: a structure 110; a computing device 102 within the structure; a system 101 for determining the position of the computing device 102; 112a and 112b; a location-driven enterprise application 122; and a mobile provider network 130. The system 101 may further include radio nodes 112a and 112b; an enterprise radio access network (eRAN) controller 114; and a location engine. The radio nodes 112a and 112b and the eRAN controller 114 may be existing network infrastructure connected to the mobile provider network 130 for providing mobile coverage and access to users of mobile devices such as computing device 102 within the structure.

It should be understood that the computing device 102 may include any appropriate type of computing device, including for example mobile phones, smartphones, tablets, desktops, laptops, workstations, servers, smart monitors, smart televisions, digital signage, scientific instruments, retail point of sale devices, video walls, imaging devices, peripherals, netbook, electronic reading device, personal digital assistant, or the like. In one example, the computing device 102 may be a mobile computing device, such as a smart phone or other mobile phone. The computing device 102 may be an unmodified device, and may operate on one or more of a variety of standard mobile provider network types, including at least: Global System for Mobile Communications (GSM), General Packet Radio Service (GPRS), cdmaOne, CDMA2000, Evolution-Data Optimized (EV-DO), Enhanced Data Rates for GSM Evolution (EDGE), and Universal Mobile Telecommunications System (UMTS). The computing device 102 may also be a third-generation (or 3G) equipped device meeting the International Mobile Telecommunications-2000 (IMT-2000) standard.

It should also be understood that the structure 110 may be any type of physical structure such as an office building, residential building, sporting arena, or other type of suitable structure. The structure may include numerous radio nodes such as the radio nodes 112a and 112b.

The radio nodes 112a and 112b, which may be a type of wireless access point or other suitable device, may connect to the computing device 102 via device connections 104a and 104b respectively, for example. The radio nodes 112a and 112b may be of a cellular type such that they provide cellular network access using standards such as GSM, GPRS, CDMA2000, EV-DO, EDGE, UMTS, and/or 3G. The device connections 104a and 104b may be automatic such that the mobile device establishes device connections 104a and 104b upon coming within range of radio nodes 112a and 112b respectively. The appropriate number of radio nodes may be dependent upon the type and/or layout of the structure 110. For example, if the structure 110 is a multi-floor high-rise office building, the structure 110 may include several of the radio nodes on each floor in such a way as to provide wireless coverage throughout each floor of the structure.

In another example, if the structure 110 is a sporting arena, a radio node may be placed in each seating section and throughout the concourse areas to provide coverage throughout the structure. Regardless of the particular the structure, the radio nodes may be placed in such a way to provide complete (or near-complete) site transport coverage with minimal building exterior signal leakage), while providing accurate and consistent location service. It should be understood that the radio nodes 112a and 112b of FIG. 1 are shown merely for illustrative purposes and should not be understood to be limiting.

As the computing device 102, which may be possessed by a person, moves throughout the building, it may connect to a variety of different radio nodes depending upon the location of the computing device 102 with respect to the radio nodes. In the example shown, while other radio nodes may be present, the computing device 102 may be in range of radio nodes 112a and 112b at a particular time, as illustrated.

The enterprise radio access network (eRAN) controller 114 may be an indoor mobile network controller connected to a mobile provider network 130. The mobile provider network 130 may be a network operated by a mobile provider such as AT&T®, Verizon®, Sprint®, T-Mobile®, or another similar carrier or provider. In one example, the eRAN controller may be a SpiderCloud® Wireless eRAN controller.

The system 101 may be a universal mobile telecommunications system (UTMS), a code division multiple access (CDMA) system, or any other appropriate type of communication system as described herein. The system 101 may provide a measurement mechanism that automatically occurs to keep the mobile devices (such as mobile device 102) and the radio nodes (such as radio nodes 112a and 112b) exchanging data, including a measurement report, between one another. In this way, the system 101 may determine the range and/or position/location of the mobile devices and/or radio nodes. A radio node, such as radio node 112a for example, may send a measurement report request to the mobile device 102 (or to another node). The mobile device 120 may send a measurement report back to the system 101 with information specific to that particular device, such as an identifier, a path loss measurement, a ratio of received energy per pseudorandom noise chip to total received power spectral density, etc.

In one example, the universal mobile telecommunications system (UMTS) common pilot channel (CPICH) may be used for transmission measurements between the computing device 102 and the radio nodes 112a and 112b, although other suitable methods may also be used. Each connected mobile device, such as the computing device 102, may generate a radio resource control (RRC) layer measurement report. In one example, the RRC layer measurement report may be generated periodically, such as every second. The eRAN controller 114 may receive the RRC layer measurement report from the computing device 102 via the radio node 112a and/or the radio node 112b. Once received, the eRAN controller 114 may process the received RRC layer measurement reports and export a location based services data stream to the location engine 120.

The location engine 120 may then extract signal measurements, such as signal path loss, between each mobile device, such as computing device 102, and any radio node in range of the mobile device, such as both radio nodes 112a and 112b. The signal path loss may be calculated as the difference between the absolute primary CPICH transmission power and the received signal code power (RSCP) measured, for example, in 0.5 dBm increments. In another example, other measurements such as the ratio of received energy per pseudorandom noise chip to total received power spectral density may also be used.

The radio nodes 112a and 112b (and any other radio nodes) may be statically positioned within the structure 110, and their position may be known, either through programming the static position into the location engine 120 or the location engine 120 may determine the position of the radio nodes 112a and 112b when they are first installed using a calculated signal path loss for each radio node and store the determined location for future use. Using the known position of the radio nodes in range of the computing device 102, the location engine 120 may periodically (e.g., every second) perform a triangulation calculation to determine the location or position of the mobile device 102 in relation to the radio nodes 112a and 112b. In one example, the triangulation may include performing a linear optimization (such as a first-order or second-order linear optimization). In this way, the location engine 120 may multilaterate the position of the computing device 102.

The calculated position may then be passed through history, smoothing, and domain knowledge filters to refine or adjust the positing estimate. In one example, the raw positioning location data may provide an inaccurate or incomplete picture of the location of the mobile device. A history filter may detect patterns of movement using the raw positioning location data so that outlier or unusual points of location may be reduced or removed from the location determination. If the mobile device is moving down a hallway, for example, a series of raw positioning location data points may reflect the movement. However, if for some reason one of the points shows up much further up the hallway in such a way that the mobile device could not have likely moved to that location in a period of time, the history filter may remove or modify that unusual data point.

A smoothing filter may be used to smooth the path along which the mobile device traveled. For example, if a user is walking with the mobile device down a hallway, the raw positioning location data may show the user appear to be bouncing off the walls or otherwise walking in a sporadic path. The smoothing filter may smooth the data into a more linear path. A domain knowledge filter may be used to remove or modify raw positioning location data points in areas a user (and consequently the mobile device) could not be walking (such as through a wall or other restricted area).

Once the position of the computing device 102 is known, the location may be passed to the location-driven enterprise application 122. The location-driven enterprise application 122 may be a dedicated server or an application running on a computing device and may provide context-aware applications to the computing device 102. For example, one context-aware application may display the real-time (or near-real-time) location of the mobile device on a site floor plan. Such an application may be useful for locating an individual, locating a lost or misplaced mobile device, etc. In another example, a backend enterprise application may aggregate site occupancy and traffic patterns and site resource utilization such as setting cafeteria hours, setting door lock/unlock timing, etc. These and other context-aware applications may utilize the location-driven enterprise application 122 and the determined position of the computing device 102 to deliver context-aware information to a user of the computing device 102.

Figure 2:
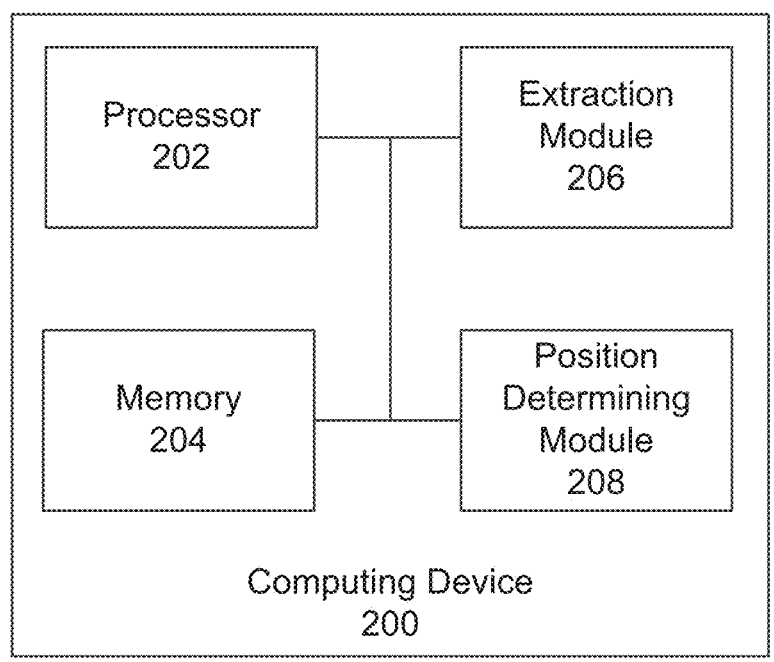
FIG. 2 illustrates a block diagram of a computing device for determining the position of a mobile device within a structure according to examples of the present disclosure.

FIG. 2 illustrates a block diagram of a computing device 200 for determining the position of a mobile device within a structure according to examples of the present disclosure. The computing device 200 may include a processor 202 that may be configured to process instructions, such as the instructions described herein. The instructions may be stored on a non-transitory tangible computer-readable storage medium, such as memory device 204 or on a separate device (not shown), or on any other type of volatile or non-volatile memory that stores instructions to cause a programmable processor to perform the techniques described herein. Alternatively or additionally, the computing device 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

The computing device 200 may also include an extraction module 206 and a position determining module 208. The extraction module 206 may be stored in the memory 204 and may execute on the processor 202. The extraction module 206 may be configured to extract from a location-based service data stream signal measurements of the path loss between a mobile device and each of a plurality of radio nodes distributed throughout a structure and in range of the mobile device. The location-based service data stream may be provided by an enterprise radio access network controller or another suitable device. In one example, the location-based service data stream may be indicative of received RRC layer measurement reports, such as from a mobile device. The signal measurement of the path loss may be determined between the mobile device and any radio node within communicative connection to the mobile device.

The positioning determining module 208 may be stored in the memory 204 and may execute on the processor 202. The positioning determining module 208 may be configured to determine the position of the mobile device within the structure using a known location for each of the plurality of radio nodes distributed throughout the structure by performing a first-order linear optimization using the extracted signal measurements of the path loss between the mobile device and each of the plurality of radio nodes. For example, the position of each radio node is static in the structure and may be known to or determined by the computing device 200. The known position of each radio node may be used to determine the position of the mobile device by performing a first-order linear optimization using the signal measurements of the path loss extracted by the extraction module 206 for the mobile device in relation to each of the plurality of radio nodes in range of the mobile device.

In one example, the computing device 200 may also include a position refining module (not shown) also stored in the memory 204 and executing on the processor 202 for passing the determined position through historical, smoothing, and domain knowledge filters. The refined position may be beneficial to context-aware applications. In one example, the determined position and/or the refined position may be transmitted to a location-driven enterprise application for providing context-aware information to a user of the mobile device.

Figure 3:
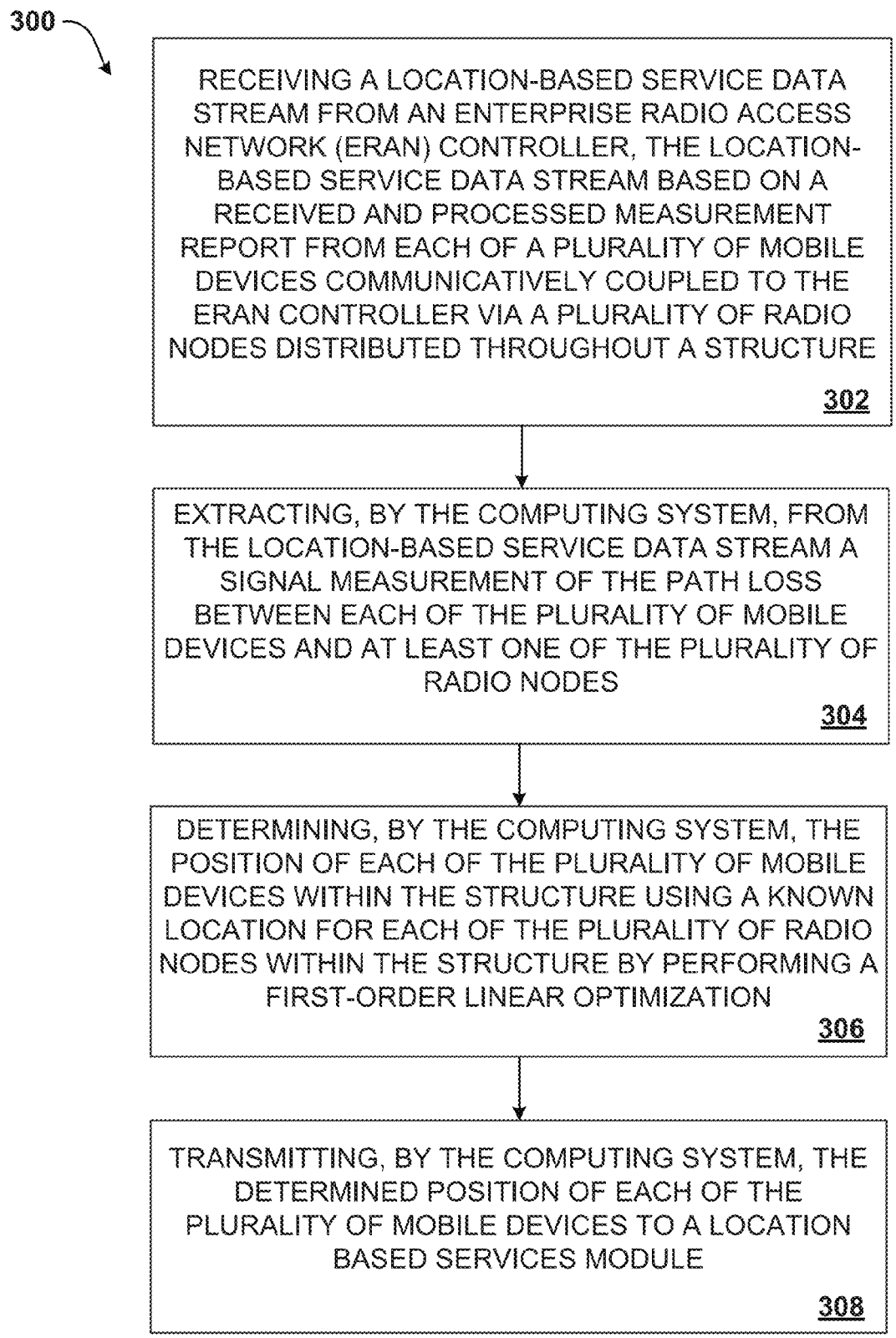
FIG. 3 illustrates a flow diagram of a method for determining the position of a mobile device within a structure according to examples of the present disclosure.

FIG. 3 illustrates a flow diagram of a method 300 for determining the position of a mobile device within a structure according to examples of the present disclosure. The method 300 may be performed, for example, by the system 101 of FIG. 1, by the computing device 200 of FIG. 2, or by any other suitable system or device.

In one example, the method 300 may include at least the following: receiving, by a computing system, a location-based service data stream from an enterprise radio access network (eRAN) controller, the location-based service data stream based on a received and processed measurement report from each of a plurality of mobile devices communicatively coupled to the eRAN controller via a plurality of radio nodes distributed throughout a structure (block 302); extracting, by the computing system, from the location-based service data stream a signal measurement of the path loss between each of the plurality of mobile devices and at least one of the plurality of radio nodes (block 304); determining, by the computing system, the position of each of the plurality of mobile devices within the structure using a known location for each of the plurality of radio nodes within the structure by performing a first-order linear optimization (block 306); and transmitting, by the computing system, the determined position of each of the plurality of mobile devices to a location based services module (block 308).

At block 302, the method 300 may include receiving, by a computing system, a location-based service data stream from an enterprise radio access network (eRAN) controller, the location-based service data stream based on a received and processed measurement report from each of a plurality of mobile devices communicatively coupled to the eRAN controller via a plurality of radio nodes distributed throughout a structure. In one example, the measurement report may be generated periodically, such as once every second. The measurement report may be generated for each of the plurality of radio nodes within communicative connection to the mobile device. The plurality of radio nodes may be distributed throughout the structure in such a way as to provide complete (or near-complete) coverage of the structure. The location of each of the plurality of radio nodes may be static and may be known. The process may continue to block 304.

At block 304, the method 300 may include extracting, by the computing system, from the location-based service data stream a signal measurement of the path loss between each of the plurality of mobile devices and at least one of the plurality of radio nodes. The location-based service data stream may be a string of data that includes a variety of information, including an identifier of the mobile device, a signal loss value, etc. The extraction may include parsing the string of data and extracting the relevant values. In one example, the extracted signal measurement may be a signal path loss between a mobile device and a radio node, which may be calculated by a location engine as the difference between the absolute primary CPICH transmission power and the received signal code power (RSCP). The signal path loss may be measured by the mobile device, for example, in 0.5 dBm increments of granularity. The 0.5 dBm increments allows for rounding the measured signals to a useful granularity. In this way, inaccurate measurements may be reduced or eliminated so as to smooth out sloppy or inaccurate measurements.

In another example, other measurements such as the ratio of received energy per pseudorandom noise chip to total received power spectral density may also be used to predict or calculate the location of the mobile device. These examples may provide different ways in which the location may be determined. For example, the ratio of received energy per pseudorandom noise chip to total received power spectral density may provide information such as a falling out range in which the mobile device is no longer in range of the radio node. The process may continue to block 306.

At block 306, the method 300 may include determining, by the computing system, the position of each of the plurality of mobile devices within the structure using a known location for each of the plurality of radio nodes within the structure by performing a first-order linear optimization. Determining the position of the mobile devices may utilize multilateration. The process may continue to block 308.

At block 308, the method 300 may include transmitting, by the computing system, the determined position of each of the plurality of mobile devices to a location based services module. The location based services module may provide context-aware data and/or applications to the mobile devices. For example, the location based services module may enable a location-driven enterprise application to provide location-driven data to at least one of the plurality of mobile devices.

The method 300 may also include refining, by the computing device, the determined position by filtering the determined position of each of the plurality of mobile devices based on historical data and by smoothing the determined position of each of the plurality of mobile devices.

Additional processes also may be included, and it should be understood that the processes depicted in FIG. 3 represent illustrations, and that other processes may be added or existing processes may be removed, modified, or rearranged without departing from the scope and spirit of the present disclosure.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A computing device, comprising:
 a processor;
 a memory;
 an extraction module stored in the memory and executing on the processor to extract from a location-based service data stream a signal measurement of the path loss between a mobile device and a plurality of radio nodes distributed throughout a structure; and
 a position determining module stored in the memory and executing on the processor to determine the position of the mobile device within the structure using a known location for each of the plurality of radio nodes distributed throughout the structure by performing a linear optimization using the extracted signal measurement of the path loss.

2. The computing device of claim 1, further comprising:
 a position refining module stored in the memory and executing on the processor to filter the determined position through a filter.

3. The computing device of claim 2, wherein the filter is selected from the group consisting of an historical filter, a smoothing filter, and domain knowledge filter.

4. The computing device of claim 1, wherein the determined position is transmitted to a location-driven enterprise application to provide context-aware information to the mobile device.

5. A method comprising:
 receiving, by a computing system, a location-based service data stream from an enterprise radio access network (eRAN) controller, the location-based service data stream based on a received and processed measurement report from each of a plurality of mobile devices communicatively coupled to the eRAN controller via a plurality of radio nodes distributed throughout a structure;
 extracting, by the computing system, from the location-based service data stream a signal measurement of the path loss between each of the plurality of mobile devices and at least one of the plurality of radio nodes;
 determining, by the computing system, the position of each of the plurality of mobile devices within the structure using a known location for each of the plurality of radio nodes within the structure by performing a linear optimization; and
 transmitting, by the computing system, the determined position of each of the plurality of mobile devices to a location based services module.

6. The method of claim 5, wherein determining the position of each of the plurality of mobile devices utilizes multilateration techniques.

7. The method of claim 5, wherein the location based services module enables a location-driven enterprise application to provide location-driven data to at least one of the plurality of mobile devices.

8. The method of claim 5, further comprising:
 refining, by the computing device, the determined position by filtering the determined position of each of the plurality of mobile devices based on historical data and by smoothing the determined position of each of the plurality of mobile devices.

* * * * *